US012746516B2

(12) United States Patent
Farahani et al.

(10) Patent No.: US 12,746,516 B2
(45) Date of Patent: Sep. 29, 2026

(54) METHOD OF FORMING A CROSS-LINKED POLYMERIC MEMBRANE

(71) Applicant: Seppure Pte Ltd, Singapore (SG)

(72) Inventors: Mohammad Hossein Davood Abadi Farahani, Singapore (SG); Alfred Jun Jie Tay, Singapore (SG); Keng Siang Goh, Singapore (SG)

(73) Assignee: Seppure Pte Ltd, Singapore (SG)

(*) Notice: Subject to any disclaimer, the term of this patent is extended or adjusted under 35 U.S.C. 154(b) by 392 days.

(21) Appl. No.: 18/036,343

(22) PCT Filed: Oct. 13, 2021

(86) PCT No.: PCT/SG2021/050616
§ 371 (c)(1),
(2) Date: May 10, 2023

(87) PCT Pub. No.: WO2022/103328
PCT Pub. Date: May 19, 2022

(65) Prior Publication Data

US 2024/0009631 A1 Jan. 11, 2024

(30) Foreign Application Priority Data

Nov. 11, 2020 (SG) ............................ 10202011197T

(51) Int. Cl.
*B01D 67/00* (2006.01)
*B01D 61/02* (2006.01)
(Continued)

(52) U.S. Cl.
CPC ....... *B01D 67/0093* (2013.01); *B01D 61/027* (2013.01); *B01D 69/02* (2013.01); (Continued)

(58) Field of Classification Search
CPC .... B01D 2323/21827; B01D 2323/219; B01D 2323/30; B01D 2325/04; B01D 2325/36;
(Continued)

(56) References Cited

U.S. PATENT DOCUMENTS 4,020,142 A 4/1977 Davis et al.
10,328,396 B2 6/2019 Livingston et al.
(Continued)

FOREIGN PATENT DOCUMENTS

CN 103079685 A 5/2013
CN 110224166 A 9/2019
(Continued)

OTHER PUBLICATIONS

Chisiang Ong et al., "Green Synthesis of Thin-Film Composite Membranes for Organic Solvent Nanofiltration", ACS Sustainable Chem. Eng., Jun. 4, 2020, vol. 8, No. 31, pp. 11541-11548.
(Continued)

*Primary Examiner* — Dirk R Bass
(74) *Attorney, Agent, or Firm* — Harness, Dickey & Pierce, P.L.C.

(57) ABSTRACT

There is provided a method of forming a cross-linked polymeric membrane, the method comprising: contacting a polymeric membrane with a cross-linking solution to form the cross-linked polymeric membrane, wherein the cross-linking solution comprises a cross-linker comprising at least one acyl halide functional group dissolved in a polar protic solvent. There is also provided a cross-linked polymeric membrane. In a preferred embodiment, hollow fiber polybenzimidazole (PBI) is crosslinked by trimesoyl chloride (TMC) or isophthaloyl chloride (IPC) in a solvent of ethanol or isopropyl alcohol (IPA).

10 Claims, 10 Drawing Sheets

(51) Int. Cl.

| | |
|---|---|
| ***B01D 69/02*** | (2006.01) |
| ***B01D 69/08*** | (2006.01) |
| ***B01D 71/64*** | (2006.01) |
| ***C08G 73/18*** | (2006.01) |

(52) U.S. Cl.
CPC ............. *B01D 69/08* (2013.01); *C08G 73/18* (2013.01); *B01D 2323/219* (2022.08); *B01D 2323/30* (2013.01); *B01D 2325/04* (2013.01); *B01D 2325/36* (2013.01)

(58) Field of Classification Search
CPC .. B01D 61/027; B01D 67/0093; B01D 69/02; B01D 69/08; B01D 71/62; C08G 73/18; C08J 2379/04; C08J 3/24; C08J 5/2256
See application file for complete search history.

(56) References Cited

U.S. PATENT DOCUMENTS

| | | | |
|---|---|---|---|
| 2006/0021502 | A1 | 2/2006 | Young et al. |
| 2020/0087473 | A1 | 3/2020 | Murdock et al. |
| 2021/0236998 | A1 * | 8/2021 | Davood Abadi Farahani ............. H01M 8/103 |

FOREIGN PATENT DOCUMENTS

| | | | |
|---|---|---|---|
| JP | 2013532578 | A | 8/2013 |
| WO | WO-2019/209177 | A1 | 10/2019 |
| WO | 2020056275 | A1 | 3/2020 |

OTHER PUBLICATIONS

L. Zhu et al., "Tightening Polybenzimidazole (PBI) Nanostructure via Chemical Cross-linking for Membrane H2/CO2 Separation", Journal of Materials Chemistry A, Sep. 5, 2017, vol. 5, pp. 19914-19923.

Bajwang Zhao et al., "Employing a green cross-linking method to fabricate polybenzimidazole (PBI) hollow fiber membranes for organic solvent nanofiltration (OSN)", Separation and Purification Technology, Sep. 10, 2020, vol. 255, pp. 117702(1-9).

Irina B. Valtcheva et al., "Beyond polyimide: Crosslinked polybenzimidazole membranes for organic solvent nanofiltration (OSN) in harsh environments", Journal of Membrane Science, Jan. 18, 2014, vol. 457, pp. 62-72.

International Search Report and Written Opinion of the International Searching Authority, issued in PCT/SG2021/050616, mailed Jan. 4, 2022; ISA/SG.

Office Action issued May 22, 2025, for JP Application No. 2023-551646; 10 pages.

Mohammad Hossein Davood Abadi Farahani et al.; "A novel crosslinking technique towards the fabrication of high-flux polybenzimidazole (PBI) membranes for organic solvent nanofiltration (OSN)"; Separation and Purification Technology, vol. 209; 2019; pp. 182-192 (available online Jul. 20, 2018).

First Office Action issued Apr. 15, 2026, for Chinese Application No. 202180075875.6; 10 pages.

* cited by examiner

UV-Vis spectra of dissolved compound

METHOD OF FORMING A CROSS-LINKED POLYMERIC MEMBRANE

CROSS-REFERENCE TO RELATED APPLICATIONS

This application is a 371 U.S. National Phase of International Application No. PCT/SG2021/050616, filed Oct. 13, 2021, which claims priority to Singapore Application No. 10202011197T, filed Nov. 11, 2020. The entire disclosures of the above applications are incorporated herein by reference.

TECHNICAL FIELD

The present invention relates to a method of forming a cross-linked polymeric membrane and a cross-linked polymeric membrane formed from the method.

BACKGROUND

Organic solvent nanofiltration (OSN) is an emerging membrane-based separation technology which can be directly employed in current manufacturing systems. OSN is a cost-effective separation technique as compared to adsorption, flash chromatography, evaporation, and distillation which are usually energy intensive, use high temperatures, and/or use a large amount of solvents thereby leading to higher production costs and environmental concerns, and result in lower quality products.

The chemical stability of OSN membranes in harsh organic solvents remains a concern. While polybenzimidazole (PBI) membranes have been envisaged, since these membranes are chemically stable and exhibit good rejection rates, most of the methods of manufacturing PBI membranes utilise hazardous and toxic solvents and chemicals.

While WO 2019/209177 discloses a method of cross-linking a polymeric membrane, the cross-linking yield may not be suitable enough for the method to be used on a large scale.

There is therefore a need for an improved method of forming high yield cross-linked membranes, particularly for OSN applications, which is low-cost, environmentally friendly and easily scalable.

SUMMARY OF THE INVENTION

The present invention seeks to address these problems, and/or to provide an improved method for forming a cross-linked polymeric membrane, particularly a polymeric membrane suitable for, but not limited to, organic solvent nanofiltration.

According to a first aspect, the present invention provides a method of forming a cross-linked polymeric membrane, the method comprising contacting a polymeric membrane with a cross-linking solution to form the cross-linked polymeric membrane, wherein the cross-linking solution comprises a cross-linker comprising at least one acyl halide functional group dissolved in a polar protic solvent.

According to a particular aspect, the polymeric membrane may be formed from at least one polymer. In particular, the at least one polymer may comprise at least one pyrrolic nitrogen group. For example, the at least one polymer may be, but not limited to: polybenzimidazole (PBI).

The polymeric membrane may be, but not limited to, a flat-sheet membrane, a hollow fibre membrane, a tubular membrane, or a dense membrane.

The cross-linker comprised in the cross-linking solution may be any suitable cross-linker comprising at least one acyl halide functional group. In particular, the cross-linker may comprise at least two or three acyl halide groups. According to a particular aspect, the at least one acyl halide functional group may be an acyl chloride functional group. For example, the at least one cross-linker may be, but not limited to: trimesoyl chloride (TMC), isophthaloyl chloride (IPC), terephthaloyl chloride or a combination thereof.

The cross-linking solution may comprise any suitable polar protic solvent. According to a particular aspect, the polar protic solvent may comprise, but is not limited to, an alcohol, a carboxylic acid, or a mixture thereof, wherein the alcohol is not a tertiary alcohol. In particular, the polar protic solvent may be, but not limited to, methanol, ethanol, isopropyl alcohol (IPA), or mixtures thereof.

The cross-linking solution may comprise a suitable amount of the cross-linker. In particular, the cross-linking solution may comprise 0.01-20% (weight/weight) of the cross-linker.

According to a particular aspect, the contacting may be for a pre-determined period of time and at a pre-determined temperature. For example, the pre-determined temperature may be 5-100° C. For example, the pre-determined period of time may be 1 minute to 120 hours.

The method may further comprise performing solvent exchange on the polymeric membrane prior to the contacting. For example, the performing solvent exchange may comprise performing solvent exchange with the polar protic solvent comprised in the cross-linking solution.

According to a particular aspect, the cross-linked polymeric membrane may have a thickness of 1-1000 μm.

According to another particular aspect, the cross-linked polymeric membrane may be hydrophilic.

According to a second aspect, there is provided a cross-linked polymeric membrane prepared from a method of the first aspect.

The present invention also provides a cross-linked polymeric membrane comprising a polymeric membrane cross-linked by a cross-linker comprising at least one acyl halide functional group, wherein the cross-linked polymeric membrane has a polymer gel content of ≥95% after polymer dissolution.

The polymeric membrane may be any suitable polymeric membrane. According to a particular aspect, the polymeric membrane may be as described above in relation to the first aspect. In particular, the polymeric membrane may be formed from a polymer comprising at least one pyrrolic nitrogen group.

The cross-linker may be any suitable cross-linker. According to a particular aspect, the cross-linker may be as described above in relation to the first aspect.

According to a particular aspect, the cross-linked polymeric membrane may be hydrophilic.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

Figure 1:
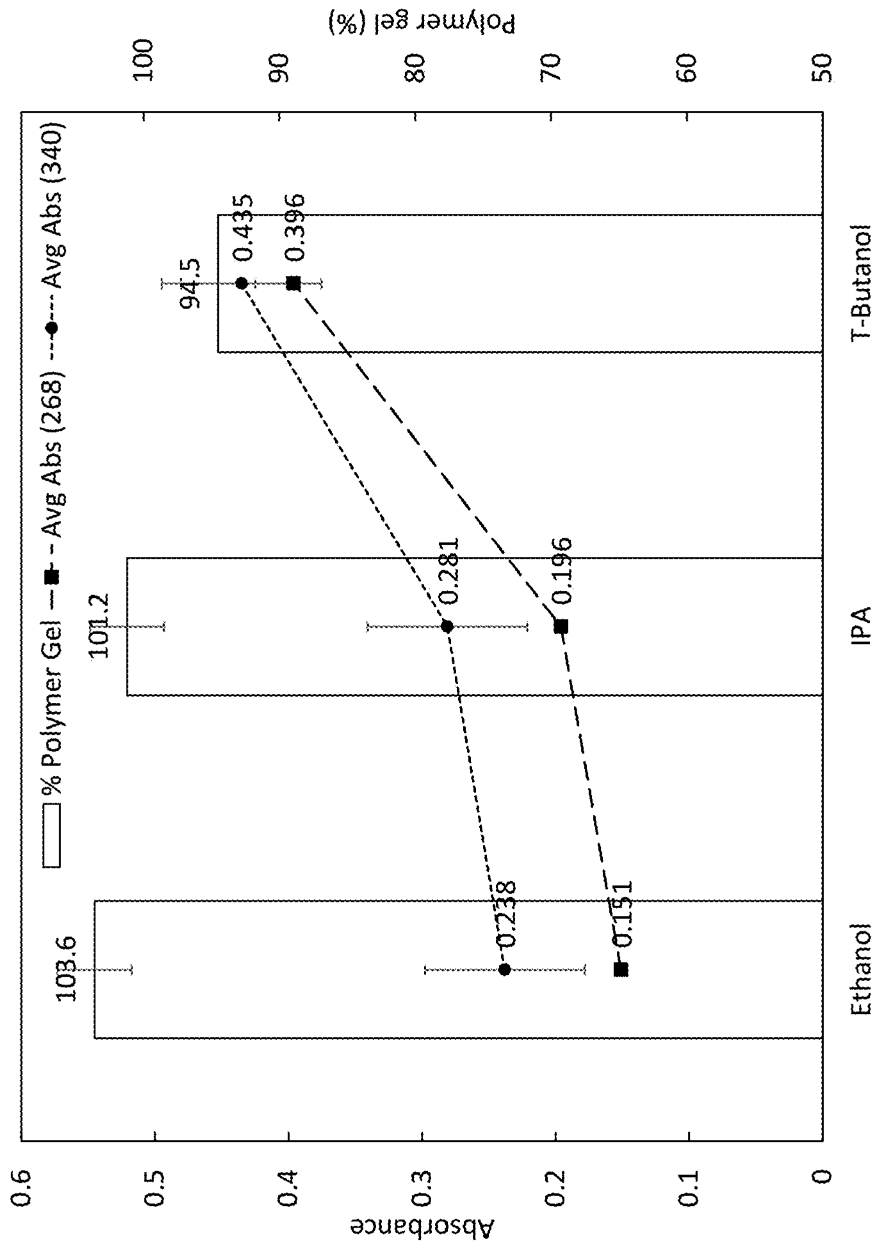
FIG. 1 shows the % polymer gel and absorbance values of the membranes cross-linked in ethanol, isopropyl alcohol (IPA), and tert-butanol.

As explained above, there is a need for an improved method of forming high yield cross-linked membranes, particularly suitable for organic solvent nanofiltration (OSN) among other applications.

Membrane separation processes, namely organic solvent nanofiltration, gas separation, fuel cell, aqueous solution separation and pervaporation are considered to be energy efficient and beneficial processes in fine-chemical, food, pharmaceutical, petrochemical and petroleum industries. These processes require a stable and high-performance membrane.

In general terms, the invention relates to an improved cross-linked polymeric membrane and a method of forming the same. In particular, the cross-linked polymeric membrane may be for, but not limited to, organic solvent nanofiltration, and may be resistant to dissolution in harsh organic solvents. Further, the method of the present invention may be an environmentally-friendly method. In particular, the method does not utilise any hazardous or toxic solvents and chemicals. Further, the method of the present invention may be a simple method and may therefore be easily scaled up at an industrial scale.

According to a first aspect, the present invention provides a method of forming a cross-linked polymeric membrane, the method comprising contacting a polymeric membrane with a cross-linking solution to form the cross-linked polymeric membrane, wherein the cross-linking solution comprises a cross-linker comprising at least one acyl halide functional group dissolved in a polar protic solvent.

The polymeric membrane may be formed from at least one polymer. The polymer may be any suitable polymer. In particular, the polymer may comprise at least one nitrogen (N) atom nucleophile. The at least one N atom nucleophile may be at least one pyrrolic nitrogen (—NH—) group. Even more in particular, the at least one N atom nucleophile may be pyridinic N of an imidazole group. For example, the at least one polymer may be, but not limited to: polybenzimidazole (PBI).

The method may further comprise forming the polymeric membrane from a polymeric solution comprising the at least one polymer prior to the providing. For example, the at least one polymer may be dissolved in a suitable solvent to form the polymeric solution. According to a particular aspect, the method may further comprise preparing the polymeric solution prior to the forming a polymeric membrane, wherein the preparing comprises mixing the at least one polymer in a first solvent. The first solvent may be any suitable solvent. For example, the first solvent may be any solvent in which the at least one polymer may dissolve, and which is compatible to membrane applications. For example, the solvent may be dimethylacetamide (DMAc), N-methyl-2-pyrrolidinone (NMP), 1-ethyl-3-methylimidazolium acetate ([EMIM]-OAc), tetrahydrofuran (THF), dichloromethane (DCM), or mixtures thereof. According to a particular embodiment, the polymeric solution may comprise PBI dissolved in DMAc.

The polymeric solution may comprise a suitable amount of the at least one polymer. For example, the polymeric solution may comprise 2-40% (weight/weight (w/w)) of the at least one polymer. In particular, the polymeric solution may comprise 5-30 w/w %, 7-25 w/w %, 10-22 w/w %, 12-20 w/w %, 15-17 w/w % of the at least one polymer. Even more in particular, the polymeric solution may comprise about 15-17 w/w % of the at least one polymer.

The polymeric membrane may be, but not limited to, a flat-sheet membrane, a hollow fibre membrane, a tubular membrane, or a dense membrane. The polymeric membrane may be an integrally skinned asymmetric membrane. The forming a polymeric membrane may comprise any suitable method of preparing a polymeric membrane. For example, if the polymeric membrane is a hollow fibre membrane, the forming may comprise spinning the polymeric solution under suitable conditions. For example, if the polymeric membrane is a dense membrane, the forming may comprise a solvent evaporation method under suitable conditions. According to a particular embodiment, the forming may comprise a non-solvent induced phase separation (NIPS) technique.

The cross-linker comprised in the cross-linking solution may be any suitable cross-linker. The cross-linker may comprise at least one acyl halide functional group. For example, the cross-linker may comprise at least two or three acyl halide functional groups. The acyl halide functional group may be a chlorine- or bromine-containing acyl functional group or an acyl group containing a mixture of halides. According to a particular aspect, the at least one acyl halide functional group may be an acyl chloride functional group. The cross-linker may be environmentally friendly and non-toxic. For example, the cross-linker may be, but not limited to: trimesoyl chloride (TMC), isophthaloyl chloride (IPC), terephthaloyl chloride or a combination thereof. In particular, the cross-linker may be TMC.

The at least one cross-linker may be dissolved in a suitable solvent to form the cross-linking solution. The solvent may be a polar solvent. In particular, the solvent may be a polar protic solvent. According to a particular aspect, the method may further comprise preparing the cross-linking solution prior to the contacting, wherein the preparing comprises mixing the cross-linker in a polar protic solvent. The polar protic solvent may be any suitable polar protic solvent. In particular, the polar protic solvent may be any polar protic solvent in which the cross-linker may dissolve, and which is compatible to membrane applications. The polar protic solvent may be environmentally friendly and non-toxic. The polar protic solvent may comprise, but not limited to, an alcohol, a carboxylic acid, or a mixture thereof, wherein the alcohol is not a tertiary alcohol. In particular, the polar protic solvent may be, but not limited to, methanol, ethanol, isopropyl alcohol (IPA), or mixtures thereof. Even more in particular, the polar protic solvent may be IPA. According to a particular embodiment, the cross-linking solution may comprise TMC dissolved in IPA.

Use of polar protic solvents enables favourable interactions, specifically hydrogen bonding interactions, with both the cross-linker and the polymeric membrane, thereby improving the mass transport of the cross-linker into the polymeric membrane. Further, the polar protic solvent does not react with either the cross-linker or polymeric membrane to form unwanted products and hence 100% product yield may be attainable. In this way, consistent product quality may be achieved by having replicable results. The other advantage of the use of polar protic solvents is that since formation of unwanted by-products does not occur, the cross-linking solution may be recycled, resulting in less chemical usage and waste generation. The lack of any side reaction also enables the cross-linking solution to be prepared any time prior to the contacting step. For example, the cross-linking solution may be prepared immediately prior to the contacting or at least 1 day prior to the contacting. This is important as on an industrial scale, the cross-linking solution need not always be prepared fresh and therefore any delays in further production steps may not result in wastage of the cross-linking solution already prepared.

The cross-linking solution may comprise a suitable amount of the cross-linker. For example, the cross-linking solution may comprise 0.01-20% (weight/weight (w/w)) of the cross-linker. In particular, the cross-linking solution may comprise 0.05-18 w/w %, 0.1-15 w/w %, 0.5-12 w/w %, 1-10 w/w %, 2-9 w/w %, 3-8 w/w %, 4-7 w/w %, 5-6 wt/wt % of the cross-linker. Even more in particular, the cross-linking solution may comprise about 0.1-2 w/w % of the cross-linker.

The contacting may comprise any suitable method in order to cross-link the polymeric membrane with the cross-linking solution. The contacting may comprise cross-linking the polymeric membrane such that the entire polymeric membrane is cross-linked. For example, the contacting may comprise immersing the polymeric membrane in the cross-linking solution.

The contacting may be at a pre-determined temperature. For example, the pre-determined temperature may be 5-100° C. In particular, the pre-determined temperature may be 10-90° C., 15-85° C., 20-80° C., 25-75° C., 30-70° C., 35-65° C., 40-60° C., 45-55° C., 50-52° C. Even more in particular, the pre-determined temperature may be 20-50° C. According to a particular aspect, the contacting may be at room temperature. In particular, the contacting may be without application of any heat.

The contacting may be for a pre-determined period of time. The pre-determined period of time may be any suitable amount of time to allow a cross-linking reaction to occur between the polymeric membrane and the cross-linker whereby the polar protic solvent facilitates the mass transport of the cross-linker via favourable interactions, such as via hydrogen bonding interactions, with both the polymeric membrane and the cross-linker. For example, the contacting may be for a suitable period of time to enable the polymeric membrane to be fully cross-linked. For example, the pre-determined period of time may be 1 minute to 120 hours. In particular, the pre-determined period of time may be 5 minutes to 100 hours, 0.5-96 hours, 1-72 hours, 5-60 hours, 6-48 hours, 12-36 hours, 18-24 hours. Even more in particular, the pre-determined period of time may be 1 minute to 48 hours, particularly 5 minutes to 6 hours. According to one particular embodiment, the contacting may be for 5 minutes to 6 hours at a temperature of 20-50° C.

The contacting may further comprise agitating the cross-linking solution and the polymeric membrane during the contacting to ensure the evenness of the cross-linking throughout the polymeric membrane. The agitating may be throughout the contacting or only for a period of time during the contacting. According to a particular aspect, the agitating may comprise continuous or intermittent recirculation of the cross-linking solution during the contacting. According to another particular aspect, the agitating may comprise moving the polymeric membrane within the cross-linking solution during the contacting.

The method may further comprise performing solvent exchange on the polymeric membrane prior to the contacting and/or after the contacting. According to a particular aspect, the method may comprise performing solvent exchange on the polymeric membrane either prior to the contacting or after the contacting. According to another particular aspect, the method may comprise performing solvent exchange on the polymeric membrane prior to the contacting and after the contacting. For example, the performing solvent exchange may comprise performing solvent exchange with the polar protic solvent comprised in the cross-linking solution. However, if the polymeric membrane had been preserved after the formation of the polymeric membrane using the same polar protic solvent as in the cross-linking solution, the solvent exchange need not be performed on the polymeric membrane prior to the contacting.

The solvent exchange may be performed for a suitable amount of time. For example, the solvent exchange may be performed for 1 minute to 48 hours. In particular, the solvent exchange may be for 5 minutes to 42 hours, 0.25-36 hours, 0.5-30 hours, 1-24 hours, 2-20 hours, 3-18 hours, 5-15 hours, 6-12 hours, 7-10 hours, 8-9 hours. Even more in particular, the solvent exchange may be performed for 1-6 hours.

The solvent exchange may be performed for a sufficient number of times. For example, the solvent exchange may be performed for 1-20 times. In particular, the solvent exchange may be performed for 1-20 times, 2-18 times, 5-15 times, 7-12 times, 8-10 times. Even more in particular, the solvent exchange may be performed for 1-5 times.

The solvent exchange may be performed for at a suitable temperature. For example, the solvent exchange may be performed at a temperature of 5-100° C. In particular, the solvent exchange may be performed at a temperature of 5-100° C., 10-90° C., 15-75° C., 20-70° C., 25-65° C., 30-60° C., 35-45° C. Even more in particular, the solvent exchange may be performed at room temperature of about 25° C.

According to a particular aspect, the solvent exchange may be performed for 1-5 times, wherein each solvent exchange is for 1-6 hours at a temperature of about 25° C.

According to a particular aspect, the cross-linked polymeric membrane formed may have a thickness of 1-1000 μm. For example, the thickness may be 5-900 μm, 10-750 μm, 25-500 μm, 50-250 μm, 100-200 μm.

The cross-linked polymeric membrane formed may be hydrophilic. In particular, the static water contact angle of the cross-linked polymeric membrane formed may be 50-Even more in particular, the static water contact angle of the cross-linked polymeric membrane formed may be 60-85°.

The formed cross-linked polymeric membrane may comprise a suitable gel polymer content. According to a particular aspect, the polymer gel content of the formed crosslinked polymeric membrane may be 95% after polymer dissolution. For the purposes of the present invention, the polymer gel content may be considered to be the cross-linking yield and may be an indication of the chemical stability of a polymeric membrane following dissolution in a harsh organic solvent. The polymer dissolution may be for a suitable period of time. For example, the polymer dissolution may be for 48-100 hours. The organic solvent may be any suitable solvent such as, but not limited to, dimethylacetamide (DMAc). In particular, the cross-linked polymeric membrane formed from the method of the present invention may have a polymer gel content of 95-100%, 96-99%, 97-98%. Even more in particular, the formed cross-linked polymeric membrane may have a polymer gel content of 98% after polymer dissolution, particularly about 100%.

Most of the prior art methods PBI cross-linking methods need either multiple steps, elevated temperatures, or utilizing of hazardous chemicals. In contrast, the method of the present invention may be carried out at room temperature, comprises a single cross-linking step, utilises an environmentally-friendly cross-linking technique which may be easily scaled-up and does not require a long duration to complete the cross-linking. Accordingly, the method of the present invention may be suitable for preparing PBI-based OSN membranes.

The present invention provides a simple and reliable method which does not utilise harsh process conditions. In particular, the method of the present invention is a relatively short method while being able to achieve a high cross-linking yield. In this way, the method of the present invention may be suitable for industrial-scale production of cross-linked polymeric membranes with consistent quality.

According to a second aspect, there is provided a cross-linked polymeric membrane prepared from a method of the first aspect.

A third aspect of the present invention provides a cross-linked polymeric membrane comprising a polymeric membrane cross-linked by a cross-linker comprising at least one acyl halide functional group, wherein the cross-linked polymeric membrane has a polymer gel content of 95% after polymer dissolution.

In particular, the cross-linked polymeric membrane may have a polymer gel content of 95-100%, 96-99%, 97-98%. Even more in particular, the cross-linked polymeric membrane may have a polymer gel content of 98% after polymer dissolution, particularly about 100% when immersed in an organic solvent for 2-100 hours, particularly 48-100 hours.

The polymeric membrane may be any suitable polymeric membrane. According to a particular aspect, the polymeric membrane may be as described above in relation to the first aspect. In particular, the polymeric membrane may be formed from a polymer comprising at least one pyrrolic nitrogen group. For example, the at least one polymer may be, but not limited to: polybenzimidazole (PBI).

The polymeric membrane may be, but not limited to, a flat-sheet membrane, a hollow fibre membrane, a tubular membrane, or a dense membrane. The polymeric membrane may be an integrally skinned asymmetric membrane. In particular, the polymeric may be a hollow fibre membrane.

The cross-linker may be any suitable cross-linker. According to a particular aspect, the cross-linker may be as described above in relation to the first aspect.

According to a particular aspect, the cross-linked polymeric membrane may be hydrophilic. Further, the cross-linked polymeric membrane formed may have a thickness of 1-1000 μm. For example, the thickness may be 5-900 μm, 10-750 μm, 25-500 μm, 50-250 μm, 100-200 μm.

The cross-linked polymeric membrane may be for use in many different applications, such as, but not limited to, organic solvent nanofiltration (OSN), gas separation, aqueous solution separation, pervaporation, and fuel cells.

Having now generally described the invention, the same will be more readily understood through reference to the following embodiment which is provided by way of illustration, and is not intended to be limiting.

EXAMPLE

Example 1—Ethanol/Isopropyl Alcohol (IPA)/Tert-Butanol as Solvents

Membrane Fabrication

The solvents used were ethanol, isopropyl alcohol (IPA), or tert-butanol. All solvents used have purity of more than 99.5%

150 mg of hollow fibre polybenzimidazole (PBI) fibres were placed in reactors (35 mL glass bottles), for solvent exchange with IPA. All fibres were soaked in 35 mL of fresh IPA for 2 hours. Thereafter, the fibres were left to soak for 24 hours in fresh IPA. Subsequently, the fibres were soaked in 10 mL of the solvent to be used for cross-linking (ethanol/IPA/tert-butanol) for 2 hours, before being left to soak for 24 hours in fresh solvent. The fibers were subsequently soaked in fresh solvent (ethanol/IPA/tert-butanol) respectively for 2 hours before the cross-linking step.

The solvent was drained from the reactor, and the cross-linking solution was poured into the reactor. The cross-linking reaction was carried out at room temperature for 2 hours.

Thereafter, the cross-linking solution was drained and the fibres were solvent exchanged with 35 mL of fresh solvent 3 times, for 30 minutes duration per soak. Subsequently, the fibers were solvent exchanged with 35 mL of fresh IPA 4 times, for minutes per solvent exchange.

Characterisation

Weight Measurements:

Two 320 mm length fibres from each run were randomly selected and cut into short strips each measuring 20 mm.

The fibres were pat dry with tissue paper before rinsing in reverse osmosis (RO) water 4 times, for 30 minutes each rinse, before drying in an oven at 105° C. The fibres were dried until constant weight was achieved. This weight was termed 'initial fibre weight'.

Another 2 fibres were randomly selected and pat dry to remove excess IPA. Next, the fibres were cut into short strips each measuring 20 mm, and soaked in 35 mL or 20 mL dimethylacetamide (DMAc) (>99.5%) for 100 hours. Subsequently, the fibres were removed and pat dry with tissue paper to remove excess DMAc. The fibres were rinsed four times in 50 mL RO water, for 30 minutes each rinse, before being removed and pat dry with tissue paper. The fibres were further dried in the oven at 105° C. The fibres were dried until constant weight. This weight is termed 'final fibre weight'.

% Polymer Gel Content Measurement:

The % polymer gel content was calculated using the formula:

$$\%\ \text{polymer gel content} = \frac{\text{final fibre weight}}{\text{initial fibre weight}} \times 100\%.$$

UV-Vis Analysis:

The cross-linked PBI polymeric membranes are termed XPBI while the non-cross-linked PBI polymeric membranes are termed NXPBI.

The UV-VIS analysis was conducted without dilution, except for XPBI using tert-butanol as the solvent, and NXPBI. In the case of using tert-butanol as the solvent, the tert-butanol was diluted 10× before the UV-Vis analysis was conducted.

Results

Results from cross-linking PBI polymeric membranes using different solvents to dissolve the cross-linker are detailed below.

Weight Measurements:

Table 1 shows the initial fibre weight and final fibre weight.

TABLE 1

Initial and Final weight obtained using two 320 mm fibres

| Solvent | Initial Weight (g) | Final Weight (g) | % Polymer Gel |
|---|---|---|---|
| Ethanol | 0.0782 | 0.081 | 103.6 |
| IPA | 0.0751 | 0.076 | 101.2 |
| Tert-butanol | 0.0873 | 0.0825 | 94.5 |

% Polymer Gel Content Measurement:

Table 2 shows the % polymer gel (i.e. degree of cross-link) using different solvents at 0.5 mmol TMC: 10 mL Solvent: 150 mg PBI fibres, for a cross-linking duration of 2 hours. The cross-linked fibres were dissolved in DMAc for 100 hours.

TABLE 2

% Polymer Gel using different polar protic solvents

| Polar protic solvent | Ethanol | IPA | Tert-butanol |
|---|---|---|---|
| % Polymer Gel | ~100% | ~100% | ~95% |

Due to experimental errors, the % polymer gel could be above 100%. The results suggest that for polar solvents, except for tert-butanol, the solvents facilitate mass transport of the cross-linker such that the reaction between the cross-linker and membrane can occur readily. Also, the solvents minimised or eliminated the formation of unwanted by-products, thereby achieving high yield (cross-linked membrane). Further, the solvents may be involved in the reaction as an auto-catalyst but due to the lack of formation of other stable products, the yield (cross-linked membrane) did not decrease, as seen by the low absorbance value and % polymer gel (FIG. 1).

Figure 2:
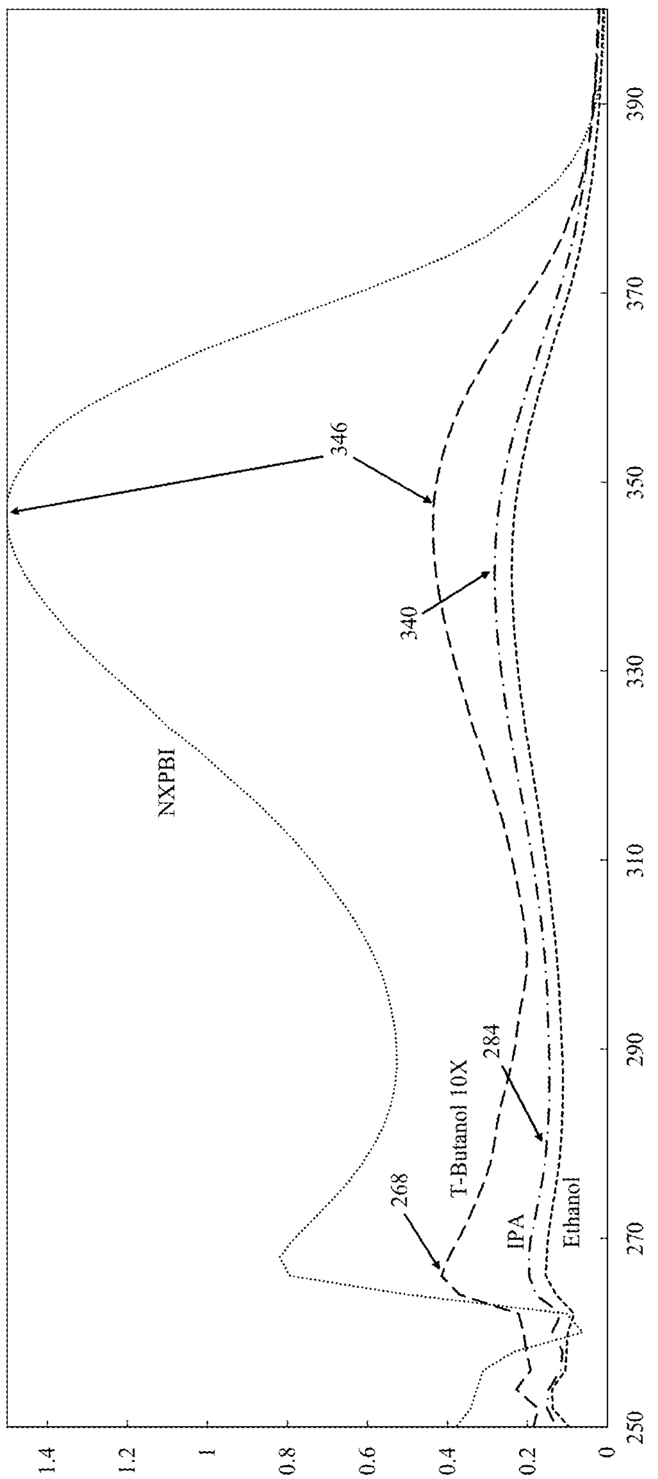
FIG. 2 shows UV-Vis analysis of XPBI in DMAc without dilution (except tert-butanol at 10× dilution) and NXPBI (200× dilution)

UV-Vis Analysis:

The UV-Vis analysis of the dissolved products provided an indication of the type of cross-linking modifications that occurred to the membranes (FIG. 2).

The formation of the new peak at 284 nm is indicative of the addition of TMC molecule to PBI membranes. As seen in FIG. 2, NXPBI showed two distinct peaks at 268 nm and 346 nm while XPBI showed at least three distinct peaks at 268 nm, 284 nm, and 340 nm.

Figure 3:
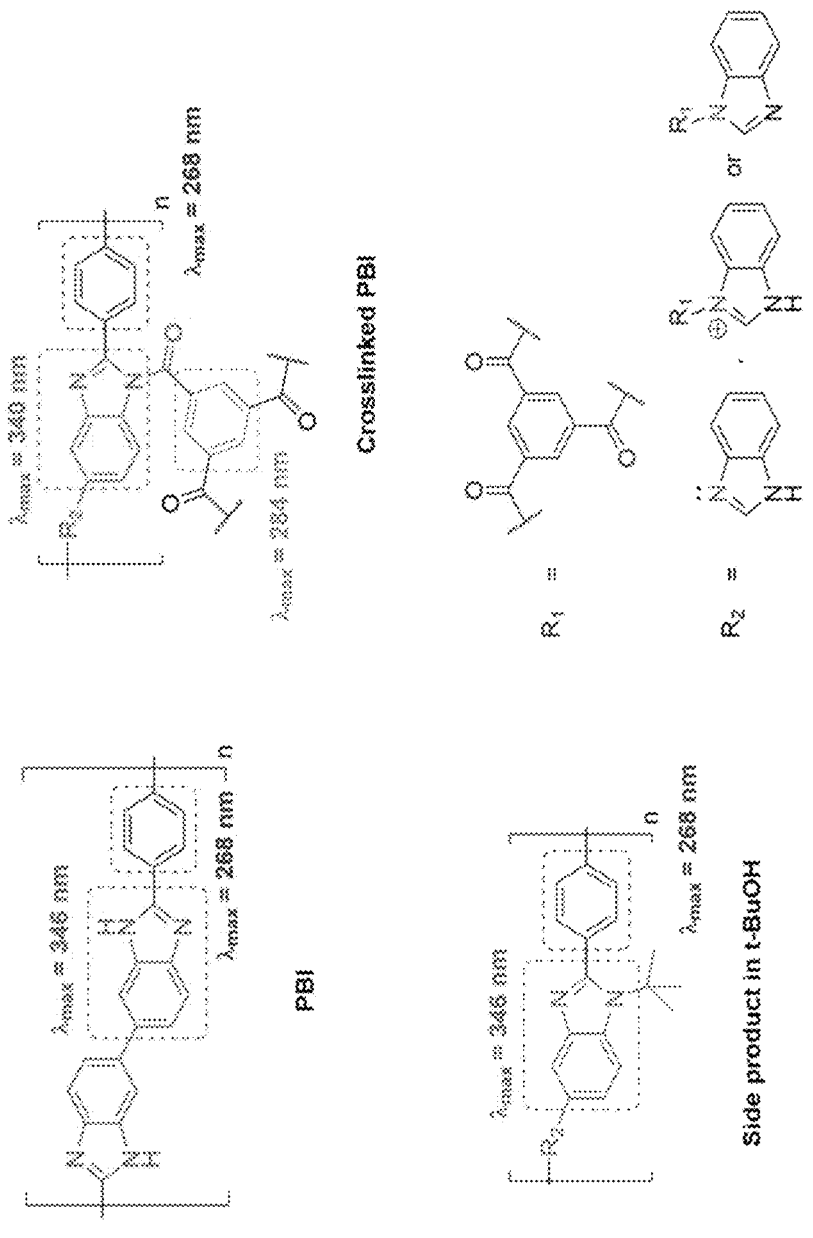
FIG. 3 shows the dissolved compounds chromophore assignment.

FIG. 3 shows the UV-Vis chromophores dissolved in DMAc.

Figure 4:
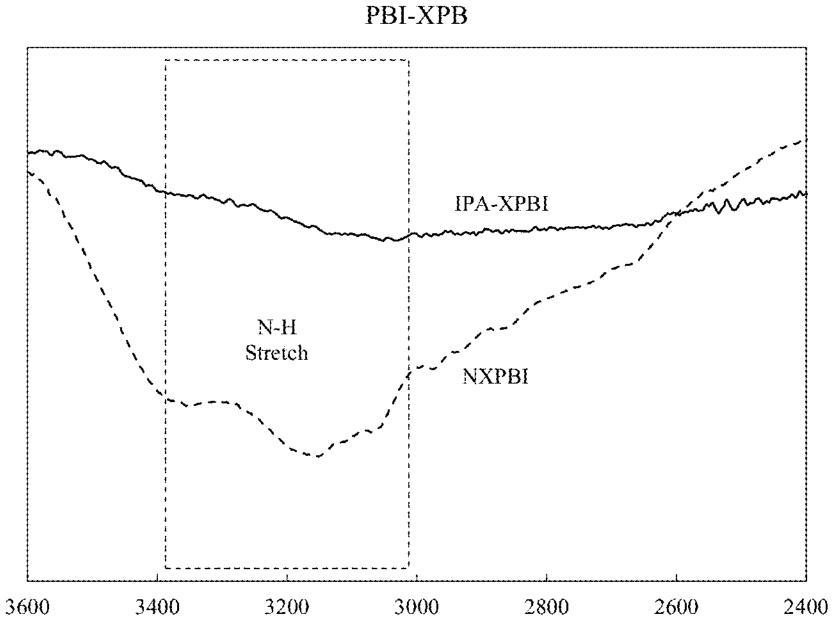
FIG. 4 shows ATR-FTIR comparison of NXPBI and XPBI (N—H) stretching.
Figure 5:
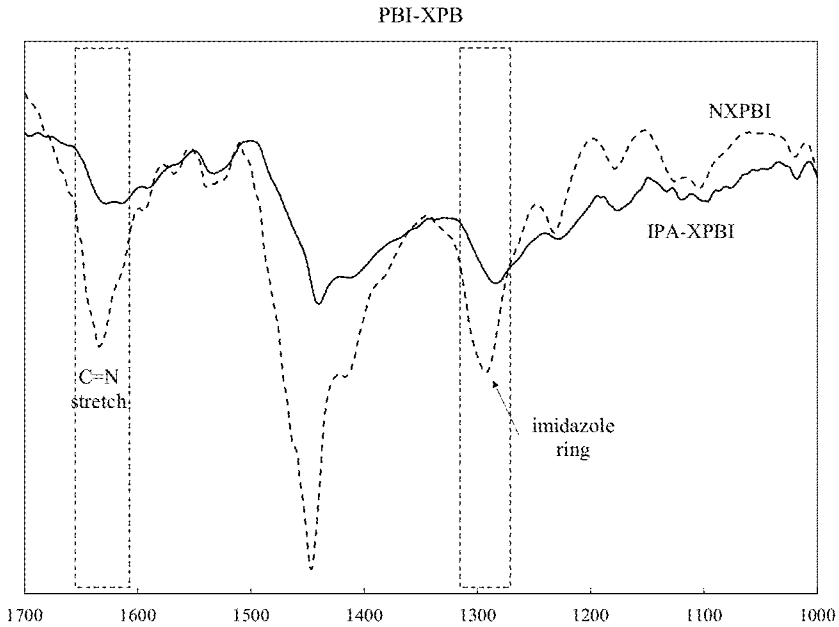
FIG. 5 shows ATR-FTIR comparison of NXPBI and XPBI (C═N and imidazole ring stretching)

Fourier Transform Infrared Spectroscopy (FTIR) Analysis:

Fourier transform infrared spectroscopy (FTIR) was used to analyse molecular functional group changes before and after cross-linking modification. The loss of the imidazole N—H stretch, the imidazole ring stretching and C═N stretch is characteristic of cross-linking reaction as tertiary amides will be formed. However, the tertiary amides (C═O) stretching and (C—N) stretching is difficult to identify and differentiate using the FTIR spectrum due to multiple overlapping peaks from the benzene structure present at that region. Nevertheless, XPBI chemical functional group differences based on the ATR-FTIR spectra were observed, as seen in FIGS. 4 and 5.

Figure 6:
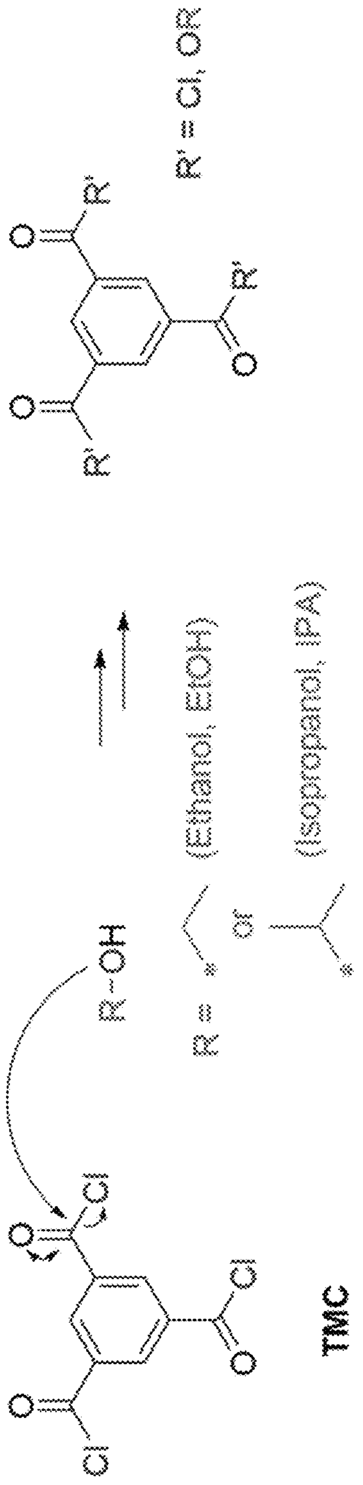
FIG. 6 shows possible mechanism for polar protic solvents.
Figure 7:
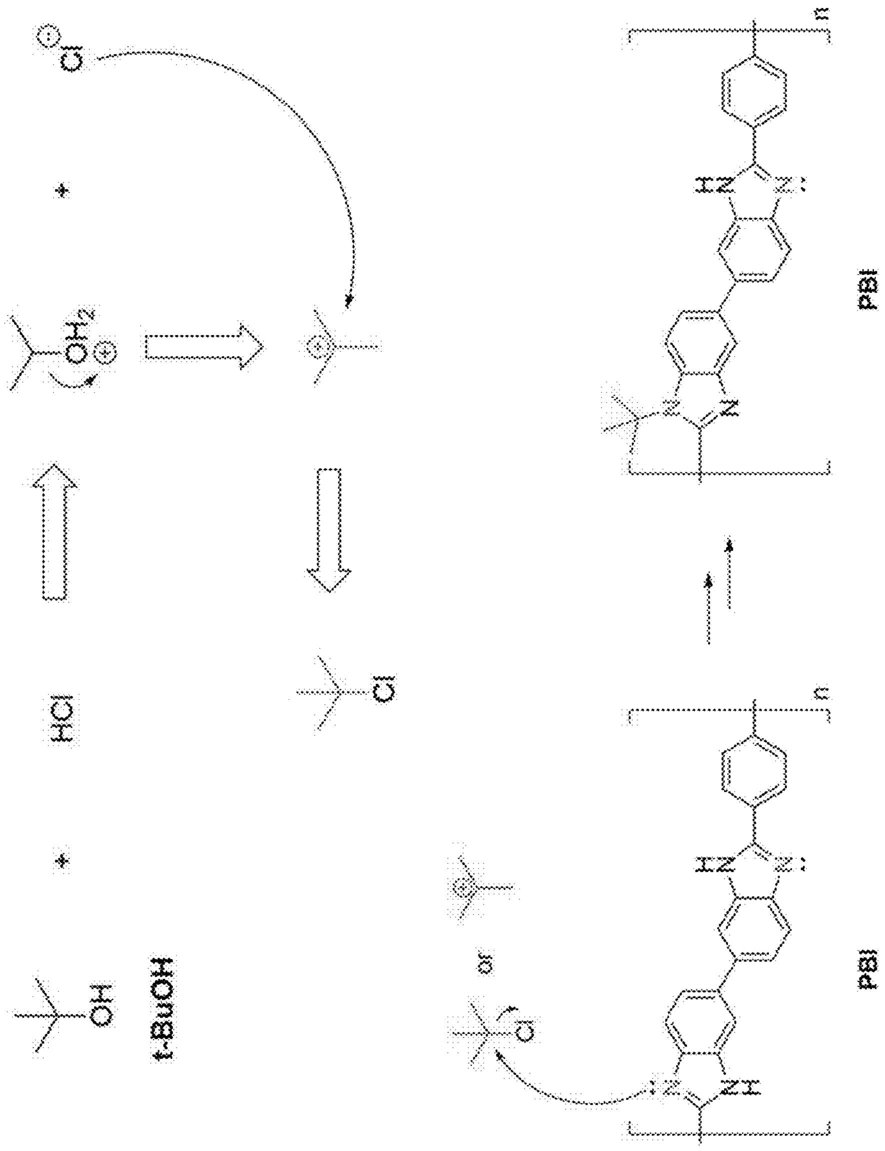
FIG. 7 shows possible mechanism for solvents that form an unwanted reaction.

FIGS. 6 and 7 show the possible mechanisms for the solvents. FIG. 6 shows the possible mechanism for polar protic solvents, such as ethanol or IPA, while FIG. 7 shows the possible mechanism for solvents that form an unwanted reaction, for example, tert-butanol.

Contact Angle Measurements:

Contact angle measurements were conducted to determine the hydrophobicity of the NXPBI and XPBI (IPA) membranes (Table 3).

TABLE 3

Water contact angle measurements for NXPBI and XPBI

| Sample | Water Contact Angle (degrees) |
|---|---|
| NXPBI | ~91 |
| XPBI using polar protic solvent (IPA) | ~84 |

Due to the formation of new amide linkages, the cross-linked membrane was expected to become more hydrophilic. As seen in Table 3, the cross-linked polymeric membrane had a greater hydrophilic character than the non-cross-linked polymeric membrane.

Example 2—Isophthaloyl Chloride (IPC) as Cross-Linker

Membrane Fabrication

Pristine PBI hollow fibre membranes were spun using dry-jet wet spinning technique. The as-spun fibres were rinsed with water that was treated with reverse osmosis system (RO water), to remove remaining solvent present in the membrane matrix. The fibres were rinsed 4 times, for 1 hour each time. The fibres were solvent exchanged with 800 mL of IPA (>99.5%) for 24 hours to prepare for cross-linking.

0.6 g of IPC was dissolved in 2 L of IPA to form 0.1 mol/L of IPC cross-linking solution. The cross-linking solution was stirred till complete dissolution. 500 fibres of length 600 mm were immersed in the cross-linking solution. A minimum cross-linking solution of 0.2 L/g of fibres was maintained to ensure sufficient cross-linker in the solution. The fibres were subsequently removed from the cross-linking solution and quenched with RO water to stop the cross-link reaction. The cross-linking times are as shown in Table 4.

TABLE 4

Cross-linking times and respective sample names

| Cross-linking time (h) | 1 | 2 | 4 | 24 |
|---|---|---|---|---|
| Sample name | XL1 | XL2 | XL4 | XL24 |

Thereafter, the RO water was replaced every hour for 4 hours to remove any remaining cross-linker and solvent. The cross-linked fibres were again solvent exchanged with 800 mL of IPA for 24 hours to prepare for post-treatment.

Subsequently, the cross-linked fibres were immersed in 2 L of 60/40 weight percent (wt. %) of glycerol/IPA for 24 hours to preserve the pores for storage. The fibres were then dried in a dehumidifier (<40% relative humidity) at 25° C. prior use.

Characterisation

Weight Measurements:

For each data point, 30 fibres of length 600 mm were used. The fibres were cut into lengths of approximately 50 mm for ease of handling. The fibres were immersed in 500 mL of IPA (>99.5%) to remove glycerol from its pores.

The fibres were then dried in oven at 70° C. for about 6 hours to remove residual IPA. The mass of the fibres was measured and recorded as 'initial fibre mass".

The fibres were then immersed in 100 mL of DMAc (>99.5%) for 36 hours to dissolve non-cross-linked polymers in the membrane matrix. The fibres were removed from the DMAc solution and transferred into 100 mL of IPA (>99.5%) to remove any residual DMAc. Subsequently, the fibres were dried in the oven at 70° C. for about 6 hours. The mass of the fibres was measured again and recorded as 'final fibre mass'.

% Polymer Gel Content Measurement:

The % polymer gel content was calculated using the formula:

$$\%\ \text{polymer gel content} = \frac{\text{final fibre weight}}{\text{initial fibre weight}} \times 100\%.$$

UV-Vis Analysis:

The polymers dissolved in the DMAc solution were also measured using GENESYS 50 Vis Spectrophotometer from Thermo Fisher Scientific. A set of non-cross-linked fibres were dissolved in DMAc to obtain the maximum absorbance of the polymer under UV-Vis. The solutions were diluted to appropriate concentrations to ensure accurate data from the instrument.

Peaks at 268 nm and 345 nm were obtained and used for the calculation of gel content using the formula below, where i is the sample name for cross-linking time, XL and NXL are the absorbance value of solutions from cross-linked and non-cross-linked fibres, respectively.

$$\text{Gel content} = \left(1 - \frac{XL_i}{NXL} \times 100\%\right.$$

Membrane Performance Test:

20 cross-linked fibres were potted into modules with an effective length of 220 mm and sealed at one end with epoxy. The epoxy was left to cure. Thereafter, a crossflow setup was used to test the RO water permeance at 5 bar. The permeate was collected after the system had stabilised (~1 h).

50 ppm of 4-Chloro-1-naphthol (4C1N) solution was prepared by adding 50 g of 4C1N into 1 L of RO water. The solution was sonicated at room temperature for at least 1 hour to fully dissolve the solute. The same crossflow setup was used to measure the selectivity of the membrane using the dye solution. Similarly, the permeate was collected after the system had stabilised (~1 h). The rejection of 4C1N was measured using GENESYS 50 Vis Spectrophotometer from Thermo Fisher Scientific. Peaks at 236 nm and 302 nm were obtained and used to calculate the rejection of the solute using the following equation, where $C_i$ and $C_0$ is the absorbance of permeate and feed, respectively.

$$R = \left(1 - \frac{C_i}{C_0}\right) \times 100\%$$

Results

% Polymer Gel Content Measurement:

The gel contents of the cross-linked fibres were obtained by measuring the difference in mass of the fibres before and after immersing in DMAc solution. The results obtained are shown in FIG. 8.

Figure 8:
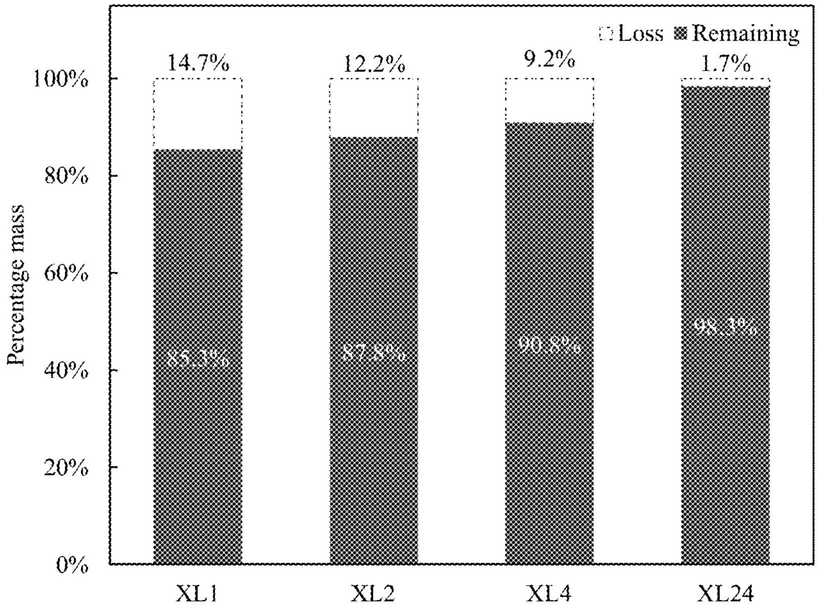
FIG. 8 shows gel content of cross-linked PBI membranes (percentage of mass loss)

As seen in FIG. 8, fibres cross-linked with IPC in IPA for 1 hour had the lowest gel content after immersing in DMAc solution. This is due to the incomplete cross-linking of IPC with the amines on the imidazole rings of PBI. PBI polymers that were not cross-linked during the reaction were dissolved into the DMAc solution. Subsequent increase in cross-linking time demonstrated higher gel content, from 85.3% at 1 hour to 98.3% at 24 hours. This shows that the cross-linking time required to achieve 100% gel content is more than 24 hours.

Figure 9:
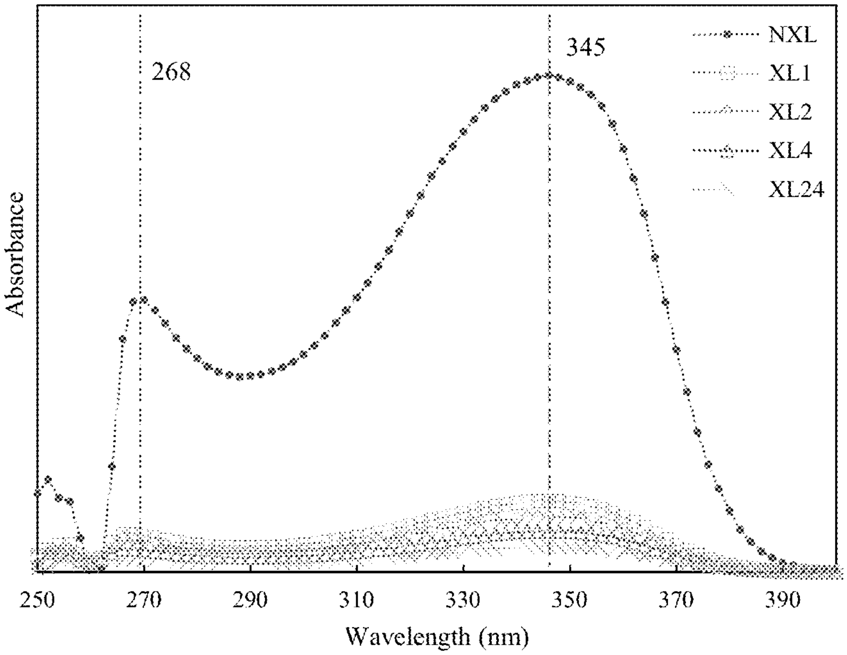
FIG. 9 shows absorbance of non-cross-linked polymer in DMAc.

UV-Vis Analysis:

The DMAc solutions used to dissolve the cross-linked fibres were measured with UV-Vis spectrometry, and the absorbance data is shown in FIG. 9.

The DMAc solution from the cross-linked fibres showed very low UV absorbance, signifying low levels of polymer dissolution in DMAc. The gel contents of the cross-linked fibres were obtained using the peak absorbances at 268 nm and 345 nm wavelength. The calculated gel contents were very similar when either peak was used. From Table 5, a trend of increasing gel content can be observed when the cross-linking time increased.

TABLE 5

Gel content of PBI membranes (UV-Vis)

| Sample | Wavelength (nm) 268 | 345 | Gel content (%) | |
|---|---|---|---|---|
| XL1 | 0.1665 | 0.313 | 86 | 85.6 |
| XL2 | 0.1455 | 0.244 | 87.8 | 88.8 |
| XL3 | 0.1 | 0.181 | 91.6 | 91.7 |
| XL24 | 0.0545 | 0.111 | 95.4 | 94.9 |
| NXL | 1.193 | 2.186 | — | |

Membrane Performance Test:

The permeability and selectivity of the cross-linked membranes were measured to evaluate the effects of cross-linking on membrane performance. The data obtained are illustrated in FIG. 10.

Figure 10:
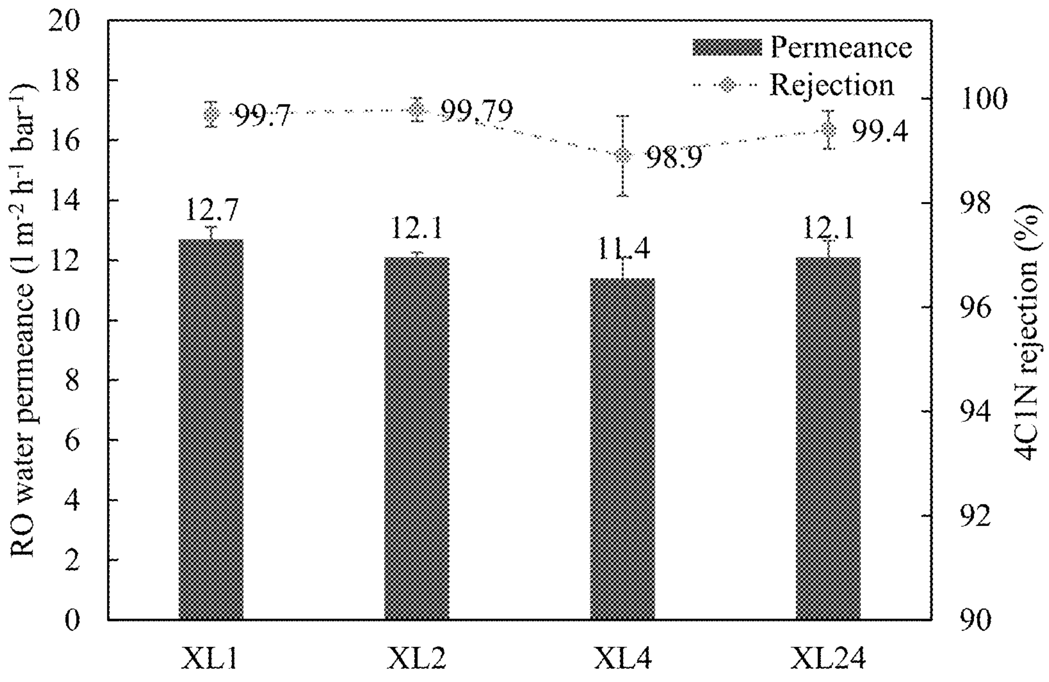
FIG. 10 shows cross-linked membrane performance (permeance and rejection)

As seen in FIG. 10, the water permeance remained relatively constant as the cross-linking time increased. This might be due to the looser cross-linking between IPC and PBI, which did not have much impact on the pore size. Similarly, the rejection of 4C1N dye by the cross-linked membranes were relatively high, with about 99% solute rejection. This result indicates that cross-linking of PBI membrane with IPC did not have much performance impact on the membrane. However, the solvent resistance of the cross-linked membranes was drastically improved, as evident from the significant improvement in the gel content.

Figure 11:
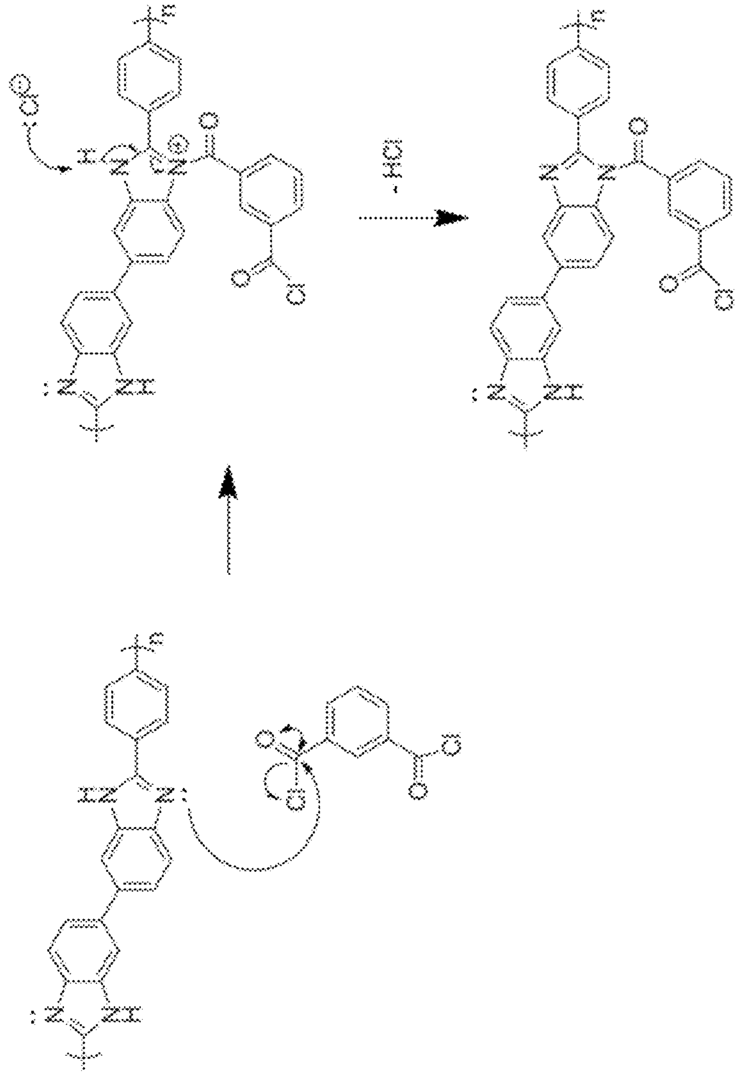
FIG. 11 shows a possible reaction pathway of PBI and IPC.
Figure 12:
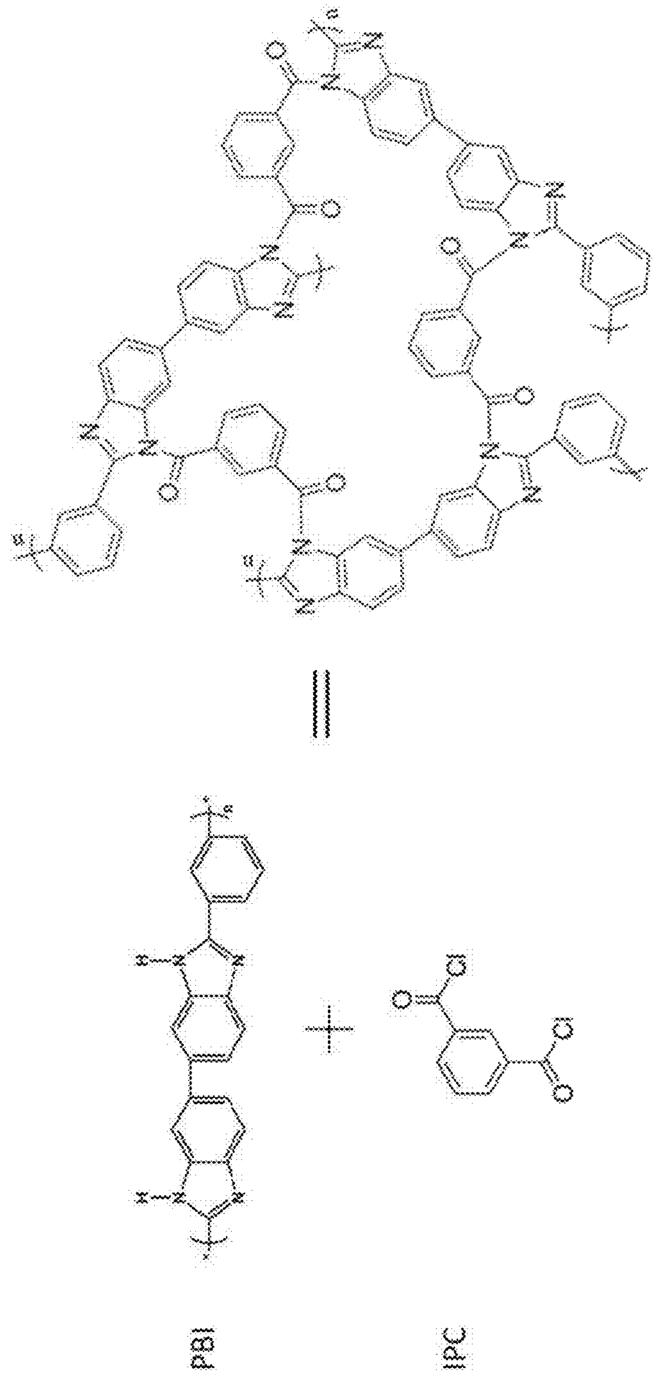
FIG. 12 shows a proposed cross-linking reaction between PBI and IPC.

FIG. 11 shows a possible reaction pathway of IPC and PBI. IPC, which contains 2 acyl chloride functional groups, reacts with the secondary amines on imidazole rings of PBI, forming tertiary amide groups. FIG. 12 shows the proposed cross-linked PBI membranes using IPC. The two acyl chloride groups from IPC will cross-link with 2 different PBI polymer, forming a larger polymer with much high molecular weight. This potentially increases the structural rigidity of the polymer, as well as improving its solvent resistance. To achieve excellent chemical stability in harsh organic solvents like DMAc, a high degree of cross-linking is required. This can be achieved by increasing the concentration of cross-linker, temperature as well as cross-linking time.

Whilst the foregoing description has described exemplary embodiments, it will be understood by those skilled in the technology concerned that many variations may be made without departing from the present invention.

The invention claimed is:

1. A method of forming a cross-linked polymeric membrane, wherein the polymeric membrane is formed from a polymer comprising at least one imidazole group, the method comprising contacting the polymeric membrane with a cross-linking solution to form the cross-linked polymeric membrane, wherein the cross-linking solution comprises a cross-linker comprising at least one acyl halide functional group dissolved in a polar protic solvent comprising at least one alcohol selected from: ethanol, isopropyl alcohol (IPA), and tert-butanol, wherein the cross-linked polymeric membrane has a polymer gel content of greater than or equal to 95% after polymer dissolution, and wherein the polymer gel content is calculated using the formula:

$$\%\ \text{polymer gel content} = \frac{\text{final fibre weight}}{\text{initial fibre weight}} \times 100\%.$$

2. The method according to claim 1, wherein the at least one acyl halide functional group comprised in the cross-linker is an acyl chloride functional group.

3. The method according to claim 1, wherein the cross-linker comprises at least two or three acyl halide functional groups.

4. The method according to claim 3, wherein the cross-linker is: trimesoyl chloride (TMC), isophthaloyl chloride (IPC), terephthaloyl chloride or a combination thereof.

5. The method according to claim 1, wherein the contacting is for a pre-determined period of time and at a pre-determined temperature.

6. The method according to claim 5, wherein the pre-determined temperature is 5-100° C. and/or the pre-determined period of time is 2 to 120 hours.

7. The method according to claim 1, wherein the method further comprises performing solvent exchange on the polymeric membrane prior to the contacting.

8. The method according to claim 7, wherein the performing solvent exchange comprises performing solvent exchange with the polar protic solvent comprised in the cross-linking solution.

9. The method according to claim 1, wherein the cross-linked polymeric membrane has a thickness of 1-1000 μm.

10. The method according to claim 1, wherein the cross-linked polymeric membrane is hydrophilic.

* * * * *